April 2, 1935.　　　F. SCHNEIDER　　　1,996,628

BATTER DISPENSER

Filed Aug. 26, 1933

INVENTOR
Frederick Schneider
BY
ATTORNEY

Patented Apr. 2, 1935

1,996,628

UNITED STATES PATENT OFFICE 1,996,628

BATTER DISPENSER

Frederick Schneider, Ozone Park, N. Y., assignor to August Thomsen & Co., Ridgewood, N. Y.

Application August 26, 1933, Serial No. 686,901

2 Claims. (Cl. 107—52)

This invention relates to improvements in batter dispensers, and more particularly intended for dispensing batter in fanciful shapes for such purposes as making cookies or the like.

Among the principal objects which the present invention has in view are: To provide a batter dispenser which may be conveniently used to obtain various fanciful shapes of the dispensed batter; to gauge the amount of batter extruded for each cookie or the like; to provide a gauge enabling the operator to see when sufficient batter has been extruded; to incorporate the gauge as part of a continuous flange; to utilize the flange for also shaping the periphery of the extruded batter; to securely hold the batter shaping dies; and to obtain other advantages and results as may be brought out in the following description.

Figure 1:
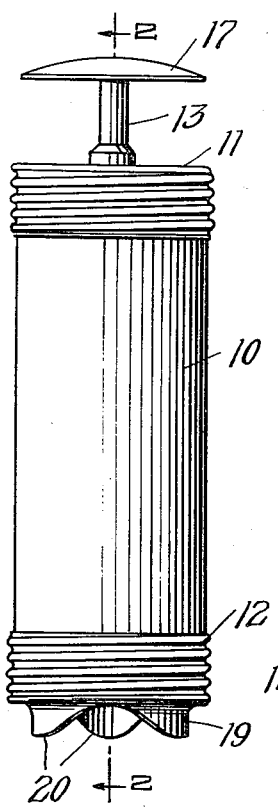
Figure 1 is an elevation of a batter dispenser in accordance with my invention.

Description:

As seen in the drawing, the batter dispenser of the present invention comprises a substantially cylindrical container body 10, the opposite ends of which are screw-threaded so that a cap or head 11 may be applied to one end, for convenience identified as the upper end, and so that a ferrule 12 may be applied to the other or lower end. The cap is shown as having a neck 13 centrally secured thereto and projecting outwardly therefrom to constitute a guide and spacer for parts of a plunger 14. Said plunger is shown as comprising a plunger head or piston 15 substantially fitting at its periphery against the inner wall of container body 10. At the middle of piston 15 is a stem or plunger rod 16 which extends axially and movably within the container body from the piston to cap 11 and projects slidably through the neck 13. A knob or other suitable handle 17 is secured to the outer end of said stem 14.

To fill the dispenser with batter, it is preferable to unscrew cap 11, at which time both the cap and the plunger are removed as an inseparable unit. Upon replacing this unit, the piston 15 engages the batter and remains at the upper end of the container body while the cap is being screwed home. The plunger is then in proper position ready to be pressed down for extruding batter from the other end of the container body.

The ferrule 12 at the lower end of the dispenser is properly threaded to remain upon the container body 10 except when intended to be removed, as for changing the shaping die. Toward the lower end of this ferrule the same is directed inwardly thereby providing an annular shoulder 18 at the inner periphery of which the metal forming the same again projects longitudinally outward forming a flange 19. This flange is shown cylindrical herein and substantially continuous circumferentially. However, said flange is preferably shaped at its outer edge such that part of the outer edge is at a greater distance from the shoulder 18 than other parts. By virtue of this construction, the said flange will function as a gauge, the portions thereof, such as indicated at 20, which protrude furthest from shoulder 18 constituting legs whereby the dispenser may be brought at its end into contact with a surface upon which the batter is to be extruded. Furthermore, the flange 19 also constitutes a restraining member by which external form or peripheral shape of the extruded batter may be obtained. Cookies or the like may accordingly be made of substantially the same appearance, shape, size and contents. In addition to the above, the construction is such that the operator may see when sufficient batter has been extruded since part of the gauge is spaced from the supporting surface and when batter is seen coming thereto, the operator will cease pressure upon the plunger.

Figure 2:
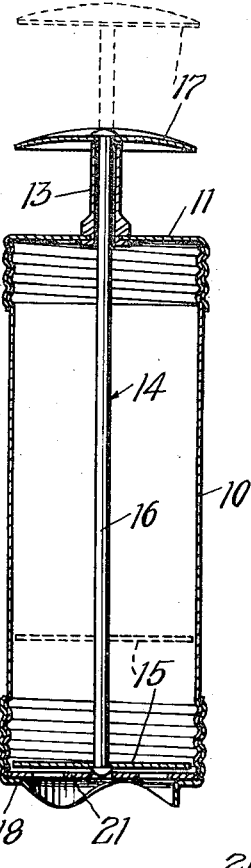
Figure 2 is a central longitudinal section thereof as taken on line 2—2 of Figure 1.
Figure 4:
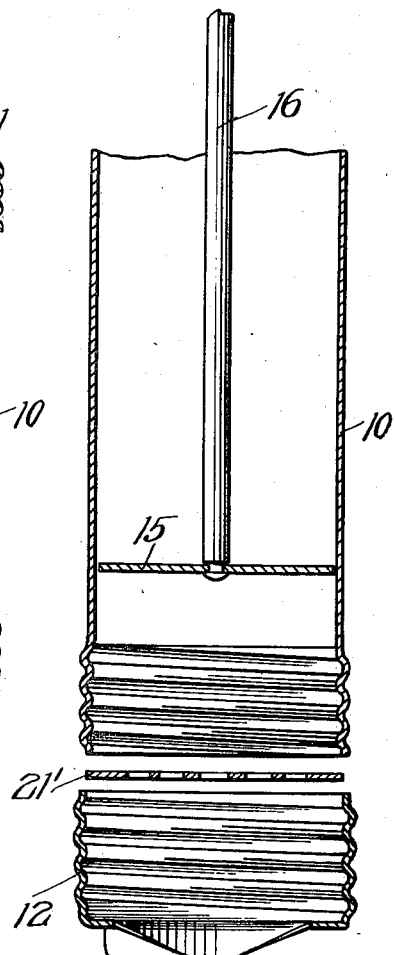
Figure 4 is an enlarged sectional view of a lower portion of the dispenser similar to Figure 2, with the ferrule and shaping die removed from, but adjacent to the container body.
Figure 3:
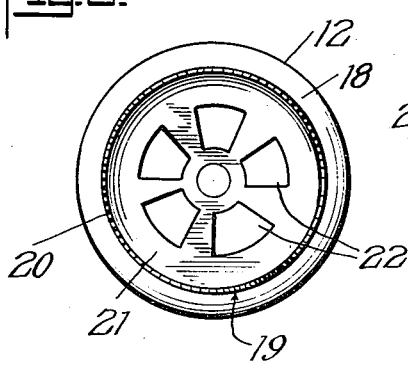
Figure 3 is a bottom plan or view of the end of the dispenser from which batter is to be extruded and showing one type of shaping die therein.
Figure 5:
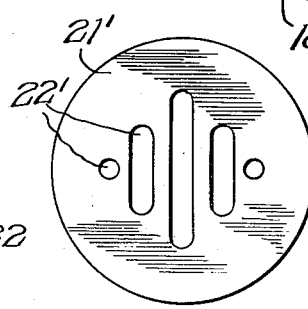
Figure 5 is a face view of another form of shaping die.

The shaping dies are constructed to be interchangeable. One die 21 is shown in the dispenser in Figures 2 and 3, whereas an interchanged die 21' is shown in Figures 4 and 5. The dies are provided with a desired arrangement of perforations 22, 22' through which the batter is to be extruded. While I have shown only two shaping dies with corresponding arrangement of perforations, it will be understood that shaping dies having any desired arrangement of perforations to obtain desired shaping of the batter may be employed, and while I have actually made and used many other perforation arrangements, it is deemed unnecessary to be more prolific in illustration.

The shaping dies are preferably made of a size and shape such that they will fit peripherally within the ferrule 12 with a margin of the die in flatwise engagement with the inside surface of shoulder 18. The lower end of container body 10 screwed within ferrule 12 will engage at its end against the upper marginal face of the shaping die and thus hold it firmly gripped in place. Nevertheless, the shaping die may be readily removed for purposes of cleaning the same or substituting another by merely unscrewing the ferrule and turning the same upside down.

I claim:

1. A batter dispenser as characterized comprising a container body having a dispenser die and means for actuating contents toward and through said die, the outer side of said die being substantially in a plane, and a collar-like flange the upper peripheral edge of which is in a plane and is juxtaposed to the die and beneath the said die, spacing said die from a supporting surface and forming substantially a circumferential confining wall and with respect to which the die forms a complete top wall for extruded material, whereby the extruded material is gauged to its outer edge both as to diameter and even thickness.

2. A batter dispenser as characterized comprising a container body having a dispenser die, and means for actuating contents toward and through said die, the outer side of said die being substantially in a plane, and legs on the body the upper ends of which are in a plane and are juxtaposed to the die and beneath the said die, spacing said die from a supporting surface and forming substantially a circumferential confining wall and with respect to which the die forms a complete top wall for extruded material, whereby the operator may see and gauge to its outer edge the extruded material.

FREDERICK SCHNEIDER.